United States Patent
Churchill et al.

(10) Patent No.: US 10,331,221 B2
(45) Date of Patent: Jun. 25, 2019

(54) METHODS FOR ANALYSING USER INTERACTIONS WITH A USER INTERFACE

(71) Applicant: SessionCam Limited, Norwich (GB)

(72) Inventors: Richard Churchill, Wymondham (GB); Joao Duarte, Norwich (GB)

(73) Assignee: SessionCam Limited, Norwich (GB)

( * ) Notice: Subject to any disclaimer, the term of this patent is extended or adjusted under 35 U.S.C. 154(b) by 269 days.

(21) Appl. No.: 15/083,640

(22) Filed: Mar. 29, 2016

(65) Prior Publication Data

US 2017/0285755 A1 Oct. 5, 2017

(51) Int. Cl.

| | |
|---|---|
| *G06F 3/048* | (2013.01) |
| *G06F 3/01* | (2006.01) |
| *G06N 20/00* | (2019.01) |
| *G06N 5/04* | (2006.01) |
| *G06N 7/00* | (2006.01) |
| *G06F 3/0481* | (2013.01) |
| *G06Q 30/06* | (2012.01) |
| *G06F 3/0488* | (2013.01) |

(52) U.S. Cl.
CPC ............ *G06F 3/017* (2013.01); *G06F 3/0481* (2013.01); *G06F 3/04883* (2013.01); *G06N 5/04* (2013.01); *G06N 7/005* (2013.01); *G06N 20/00* (2019.01); *G06Q 30/0641* (2013.01)

(58) Field of Classification Search
CPC ...... G06N 99/005; G06N 7/005; G06N 20/00; G06F 3/017; G06F 21/6218
See application file for complete search history.

(56) References Cited

U.S. PATENT DOCUMENTS

| | | | |
|---|---|---|---|
| 5,483,468 A | * | 1/1996 | Chen ..................... G06F 3/033 345/418 |
| 7,921,069 B2 | | 4/2011 | Canny et al. |
| 8,117,209 B1 | | 2/2012 | Dean et al. |
| 8,606,725 B1 | | 12/2013 | Agichtein et al. |
| 2009/0006363 A1 | | 1/2009 | Canny et al. |
| 2009/0327975 A1 | * | 12/2009 | Stedman ............... G06F 3/0416 715/863 |
| 2011/0169748 A1 | * | 7/2011 | Tse ........................ G06F 3/0425 345/173 |
| 2012/0323682 A1 | * | 12/2012 | Shanbhag .......... G06Q 30/0601 705/14.51 |
| 2013/0268468 A1 | | 10/2013 | Vijayaraghavan et al. |

(Continued)

FOREIGN PATENT DOCUMENTS

| | | |
|---|---|---|
| WO | WO 2014/113381 A1 | 7/2014 |
| WO | WO 2015/191828 A1 | 12/2015 |

OTHER PUBLICATIONS

U.S. Appl. No. 14/797,676, filed Jul. 13, 2015, Churchill.

(Continued)

*Primary Examiner* — Claudia Dragoescu
(74) *Attorney, Agent, or Firm* — DASCENZO Intellectual Property Law, P.C.

(57) ABSTRACT

Computer-implemented methods for analyzing interactions between a user and a computing device include analyzing user interaction data to identify a plurality of user gestures, and analyzing the gestures to identify those likely to represent user struggles or difficulties encountered with a user interface. A predictive model is generated from this analysis for use in identifying user gestures likely to represent user struggles during further user sessions.

26 Claims, 8 Drawing Sheets

(56) References Cited

U.S. PATENT DOCUMENTS

| | | | |
|---|---|---|---|
| 2013/0278501 A1* | 10/2013 | Bulzacki | G06F 3/017 |
| | | | 345/157 |
| 2014/0278765 A1 | 9/2014 | Chiu | |
| 2015/0278346 A1* | 10/2015 | Aiello | G06F 17/30663 |
| | | | 707/748 |
| 2015/0370333 A1* | 12/2015 | Ataee | G06F 3/017 |
| | | | 345/156 |
| 2016/0026560 A1* | 1/2016 | Jackson | H04W 4/029 |
| | | | 714/38.1 |
| 2017/0061307 A1* | 3/2017 | Bates | H04L 41/142 |

OTHER PUBLICATIONS

"IBM Tealeaf CX," IBM Software Industry Solutions, IBM Corporation, 2013.
Arapakis et al., Understanding Within-Content Engagement through Pattern Analysis of Mouse Gestures, CIKM'14, Nov. 3-7, 2014, Shanghai, China.
Ward, Darren, "Keeping score of your customer's experience," UserReplay, www.userreplay.com, downloaded Mar. 24, 2016.

* cited by examiner

METHODS FOR ANALYSING USER INTERACTIONS WITH A USER INTERFACE

FIELD OF THE DISCLOSURE

The present disclosure relates to methods for analysing user interactions with a user interface. More particularly, it is concerned with analysing user interactions to identify user gestures likely to represent user struggles or difficulties in interacting with the user interface.

BACKGROUND TO THE DISCLOSURE

It is advantageous for an online company or software developer to be able to understand how their users interact with user interfaces associated with their products and services. It is of considerable value to be able to identify why users of websites experience difficulties which may lead them to abandon products placed in shopping carts, abort sign up processes or abandon their user session completely, or why users of software applications encounter problems and become frustrated by a graphical interface.

Conversion analysts and online marketing analysts are continually attempting to identify problems in user journeys to both measure and correct issues that are preventing users from completing their session or carrying out certain tasks, such as adding products to a basket, checking out to purchase products in a basket, data entry and data lookups for example.

The ability to identify customer problems quickly and easily to expedite fixes to problems in a website sales funnel or a software application can significantly reduce frustration levels felt by users. Revenue can be increased, impact on brand and market position can be minimised and the burden on customer support processes reduced.

Funnel processes that involve purchase points provide website owners with a means of converting visitors into paying customers through a series of pages that can be measured, analysed and improved upon, thereby increasing revenue potential.

Web analytics is a well understood method for measuring online activity and identifying groups of users who are experiencing problems with an online process. However, whilst analytics may indicate to an analyst where a process is aborted prematurely, they do not identify what the cause is.

A user interface may often generate hundreds of thousands or millions of user sessions. Sifting through this data to find key pieces of insight poses a real problem for any conversion analyst.

SUMMARY OF THE DISCLOSURE

A computer-implemented method of analysing interactions between a user and a computing device is provided. The method uses at least one data processor and electronic data storage and comprises storing user interaction data in the data storage, wherein the user interaction data is derived from user interactions with the computing device using an electronic input device during at least one user session. In addition, the method includes carrying out the following steps with the at least one data processor: retrieving the user interaction data from the data storage; analysing the user interaction data to identify a plurality of user gestures; analysing the plurality of user gestures to identify user gestures likely to represent user struggles and generating a predictive model with reference to this analysis for use in analysing user gestures to identify user gestures likely to represent user struggles; and outputting the predictive model to the data storage.

Also disclosed are systems, devices and software associated with the present methods.

BRIEF DESCRIPTION OF THE DRAWINGS

Embodiments according to the present disclosure will now be described by way of example and with reference to the accompanying schematic drawings, wherein.

DETAILED DESCRIPTION AND BEST MODE OF THE DISCLOSURE

Figure 1:
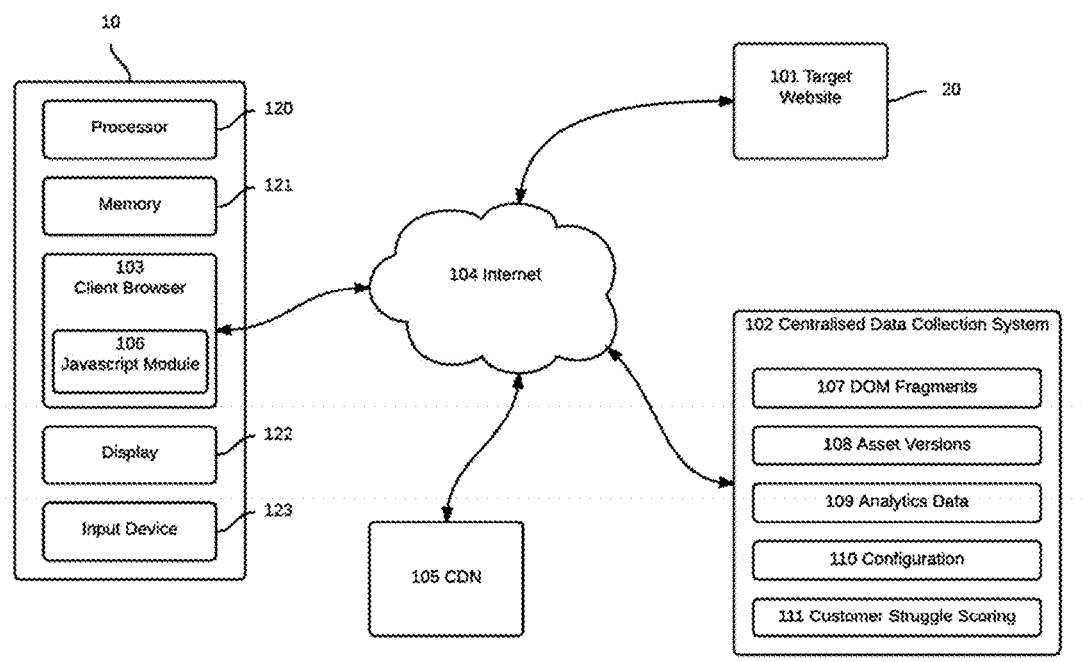
FIG. 1 is a block diagram of a network architecture for use according to the present disclosure.

A computer-implemented method of analysing interactions between a user and a computing device is provided. The method uses at least one data processor and electronic data storage and comprises the steps of:

(a) storing user interaction data in the data storage, wherein the user interaction data is derived from user interactions with the computing device using an electronic input device during at least one user session, and with the at least one data processor:

(b) retrieving the user interaction data from the data storage;

(c) analysing the user interaction data to identify a plurality of user gestures;

(d) analysing the plurality of user gestures to identify user gestures likely to represent user struggles;

(e) generating a predictive model with reference to the analysis of step (d) for use in analysing user gestures to identify user gestures likely to represent user struggles; and (f) outputting the predictive model to the data storage.

In this manner, a predictive model is generated for subsequent use in identifying user struggles in a user session. This enables automatic and precise identification of areas of a user interface which may be causing users to experience difficulties.

Allowing an analyst fast access to sessions for those users that struggled and the degree to which struggle has been observed is of great interest to a growing optimisation market. Time can be better spent understanding their biggest issues from a user point of view through the use of a near real time feed of struggle situations that are occurring.

The present disclosure enables sessions where a user has struggled to complete their objective to be automatically identified. It achieves this by analysing user interaction data, which may represent a feed of granular user behaviour, to determine whether a user may have encountered one or more struggles along their journey. This allows the highest priority problem areas of a user interface such as a website to be automatically identified quickly. These problem areas may also be tracked over time to see whether the number of struggles associated with it increases or decreases, for example in response to changes made to the interface.

The use of predictive modelling according to the present disclosure to enrich an understanding of a user journey may enable an application owner to prioritise areas to focus on in order to improve their website, mobile application, desktop computer application or other software involving a user interface.

A predictive model may be generated by analysing an initial (or "training") set of user interaction data generated during use of one or more user interfaces. The model may then be used to analyse user gesture data derived from another set of user interaction data. The use of a model may enable data to be analysed more quickly and efficiently, and may give a greater degree of accuracy. The predictive model may be used to analyse user interaction data generated using the same user interface(s) with which the training data was associated. It may also be suitable for analysis of user interaction data generated using other user interfaces.

Identification of user gestures likely to represent user struggles may include using statistical analysis to identify groups of similar gestures made by users of a given interface which occur more frequently than during use of that interface than during use of other interfaces. These distinctive gestures are likely to be indicative of user struggles.

User struggles may be patterns of user behaviour or user gestures derived from user interaction data which are associated with confusion on the part of the user or a user experiencing a high cognitive load when interacting with a graphical user interface.

Machine learning of the behavioural traits which represent a struggling user may be applicable across a wide range of circumstances and platforms. The present disclosure may be employed in relation to a website system and may also be applied to any area where user interaction data may be gathered for processing from a user session involving a graphical user interface.

The user interaction data may be derived with reference to signals received by a data processor from an electronic user input device during a user session which is used to interact with a graphical user interface. The user interaction data may represent user motions which are captured electronically via use of the input device. The data may be captured by a client-side application. An example of an application of this form is described in the present assignee's U.S. patent application Ser. No. 14/797,676.

The user interaction data representing the user behaviour may be divided into separate, discrete user gestures for further analysis. Each user gesture may correspond to a period of continuous movement by the user. The user gestures may be non-overlapping. They may occur sequentially in the user interaction data. They may be contiguous or there may be portions of data present between consecutive user gestures. Division of the user interaction data into user gestures may allow statistical methods to be used in embodiments to target different types of user behaviour and weight them accordingly. Analysis according to the present disclosure may be used to identify which of the user gestures are likely to represent user struggles. The analysis may assign a probability to at least one of a user gesture, a portion of a user interface, a portion of a user session, and a user session, which probability is indicative of the likelihood of the presence of user struggle.

Step (d) of the method defined above may comprise analysing each user gesture to determine a numerical value for each of a plurality of gesture properties in relation to each user gesture.

These gesture properties may correspond to at least one of: a duration of the gesture, coverage of a gesture, an average speed of the gesture, a maximum speed, an average acceleration during the gesture, a maximum acceleration, a distance traveled during the gesture, a rotation defined with reference to the gesture, and a direction of the gesture. The number of gesture properties determined in relation to each user gesture may be varied to suit different circumstances. It may be beneficial in some circumstances to use a large number of different properties, up to 50 or more for example.

A predictive model generated according to the present disclosure may comprise at least one module for processing a plurality of user gestures. The modules may comprise one or more of: a scaling model, a dimensionality reduction model, a clustering model, a re-weighting model, and a classification model.

Step (d) of the method defined above may include determining and applying a scaling process to the numerical values for at least one of the gesture properties.

A scaling model may be derived from training data. It may be used to centre each gesture property to zero and scale the values for each property so that they have a predetermined standard deviation, such as 1, for example. The scaling model may be generated by computing the mean and standard deviation values for the values associated with one or more of each gesture property using training data. To transform the original property values to scaled ones, the model may preferably subtract the mean of the property values from each property value and then divide the resulting value by the standard deviation value.

Step (d) of the method defined above may include applying a dimensionality reduction method to a plurality of the gesture properties.

A dimensionality reduction model may generate a projection of the scaled properties into a lower dimensional representation using principal component analysis (PCA), for example. PCA is a statistical procedure that generates an orthogonal transformation to convert a dataset of possibly correlated dimensions into a set of values of linearly uncorrelated dimensions.

Step (d) of the method defined above may include defining a plurality of gesture clusters, with each cluster comprising a plurality of the user gestures, wherein each cluster is defined with reference to at least one of the gesture properties.

A clustering model may comprise a clustering algorithm. This algorithm may use the lower dimensional representation resulting from use of the dimensionality reduction model. The clustering model may use density-based clustering for example, such as k-means. The clustering model may be generated by identifying groups of gestures with reference to a training data set such that groups of similar gestures are placed in the respective clusters. The clustering model may assign a clustering label to each cluster of gestures.

Step (d) of the method defined above may include assigning a weight value to each gesture cluster, with the weight value indicating the relative importance of the cluster in relation to the other clusters.

A "bag of gestures" may be generated which comprises a vector of a size which corresponds to the number of clusters defined by the clustering model. A bag of gestures may be generated for an individual user session, page of a website or part of an individual user session. Each entry of the vector may contain the frequency of the corresponding type of gestures in that session, page or session segment. Since some types of gestures are very common while others are rare, a re-weighting model may be generated using a technique such as TF-IDF (term frequency-inverse document frequency), sublinear TF scaling or maximum TF normalisation. A re-weighting model may comprise a weighting value for each type of gesture (that is, each cluster of gestures) identified in a training data set for use in re-weighting data from a further user session.

Step (d) of the method defined above may include assigning a struggle value to each gesture cluster, with the struggle value indicating the likelihood that the user gestures of the gesture cluster represent user struggles.

A classification model may be generated using a probabilistic classification algorithm (such as logistic regression for example). This model may be derived with reference to the re-weighted representation of the bag of gestures. It may produce a value (between 0 and 1 for example) representing the probability of struggle in a corresponding session, webpage or session segment.

To increase the accuracy of a predictive model created in accordance with embodiments of the present disclosure, the method may automatically reduce the relative importance or weight assigned to user gestures that are less relevant to identifying a user exhibiting signs of struggle.

Groups of user gestures having one or more similar characteristics or properties may be automatically identified and weighted relative to each other in embodiments of the present disclosure, thereby allowing new areas of customer struggle to be identified without human intervention.

Automated dimensional reduction techniques may be utilised according to embodiments of the present disclosure to identify user gestures which are likely to involve user struggle and allocate relative priorities to them.

The different portions (for example web pages, regions of web pages, windows or other graphical features) of a user interface which are identified as likely to be causing user struggle may be automatically prioritised according to embodiments of the present disclosure, by calculating an associated struggle score.

The input device may be selected from: a mouse, a touch-sensitive screen, a joystick, and a system able to detect remote user movements, using infra-red or capacitive sensors for example.

According to the present disclosure, a computer-implemented method of analysing user interactions with a computing device to identify user interactions likely to represent user struggles is provided, wherein the method uses at least one data processor and electronic data storage storing a predictive model generated using the methods described herein. The method may comprise the steps of:

(i) storing user interaction data in the data storage, wherein the user interaction data is derived from user interactions with the computing device using an electronic input device during a user session, and with the at least one data processor:

(ii) retrieving the user interaction data from the data storage;

(iii) analysing the user interaction data to identify a plurality of user gestures as described herein;

(iv) retrieving the predictive model from the data storage; and (v) analysing the plurality of user gestures using the predictive model to identify the user gestures likely to represent user struggles.

The user interaction data may be derived from user interactions during a plurality of user sessions involving a computer-implemented graphical interface, and the method may include the step of identifying at least one user session or portion of the interface which is associated with user gestures likely to represent user struggles.

The at least one data processor may calculate a respective struggle score for each of the sessions or portions indicative of the likelihood that it is associated with user gestures that represent user struggles. Furthermore, the at least one data processor may determine a priority order for the sessions or portions with reference to their respective struggle scores.

The at least one data processor may calculate a count value for a selected session or a portion of the interface with reference to how many of the user sessions involved user gestures likely to represent user struggles with the selected session or portion of the interface at a specified point in time or during a specified period of time. The processor may output signals for sending to a display device so as to cause the display device to display a plot of a parameter dependent on the count value for the selected session or portion of the interface against time.

The at least one data processor may calculate the count value for a plurality of selected sessions or portions of the interface, and determines a priority order for the selected sessions or portions with reference to their respective count values.

The at least one data processor may receive an input signal identifying a user session, and outputs signals for sending to a display device so as to cause the display device to display a replay of at least part of the user session.

A computer network for use in implementation of embodiments of the present disclosure is shown in FIG. 1. In this example, a user interacts with a website. It will be appreciated that user interaction data may also be collected for analysis in relation to interfaces generated by a software application running locally on a user's device.

In FIG. 1, a number of computer systems at different locations are communicatively coupled together via an external network such as the Internet 104. A data collection system 102 is remote from the website server 20 with which a user interacts. Program instructions, in the form of JavaScript for example, for implementing a recording method are delivered by a content delivery network (CDN) 105. The user accesses the target website 101 on server 20 using a browser 103 on the user's own computing device 10 via the Internet 104. Computing device 10 has a processor 120 and memory 121.

When the user views a webpage of the website 101 on the server 20, this causes program instructions to be delivered from the CDN 105 to the user's computing device 10, installing a recording tool on the device. This may be in the form of a JavaScript module 106.

During the user's web session, data is collected by the JavaScript module which records the user's interactions with the website in the form of user interaction data. This data is transferred to the data collection system 102. This data is processed and saved by the data collection system into a selection of data stores and indexed ready for retrieval. The stored data may comprise entries associated with elements of the webpage (denoted as "DOM Fragments" 107 in FIG. 1), versions 108 of assets present in the web page, analytics data 109 (that is, data corresponding to recorded events such as entries into input fields, mouse activity, keystrokes, DOM changes and interaction with links between webpages) and information 110 about the configuration of the webpage. Communication between the JavaScript module and the data collection system occurs at regular intervals to ensure accurate tracking of the session until the user leaves the website in question.

The data collection system includes a customer struggle scoring system 111. The struggle scoring system is able to retrieve user interaction data stored by the data collection system for further analysis in accordance with the present disclosure. This analysis is carried out by a data processor associated with the struggle scoring system. This processor may be dedicated to the operations associated with the struggle scoring system. Alternatively it may also carry out other tasks, and for example, be used to also carry out other processes undertaken by the data collection system 102.

It will be appreciated that the data processor associated with the struggle scoring system may be in the form of a number of processors, a multi-processor core, or some other type of processor, depending on the particular implementation. Further, the processor may be implemented using a number of heterogeneous processor systems in which a main processor is present with secondary processors on a single chip. As another illustrative example, the processor may be a symmetric multi-processor system containing multiple processors of the same type.

Data storage associated with the struggle scoring system may be any piece of hardware that is capable of storing information, such as, for example, without limitation, data, program code in functional form, and other suitable information either on a temporary basis or a permanent basis. The data storage may be, for example, a random access memory or any other suitable volatile or non-volatile storage device.

Processing carried out by the customer struggle scoring system 111 in embodiments of the present disclosure will now be described in more detail with reference to FIGS. 2 to 8. An overview is shown in FIG. 2.

Figure 2:
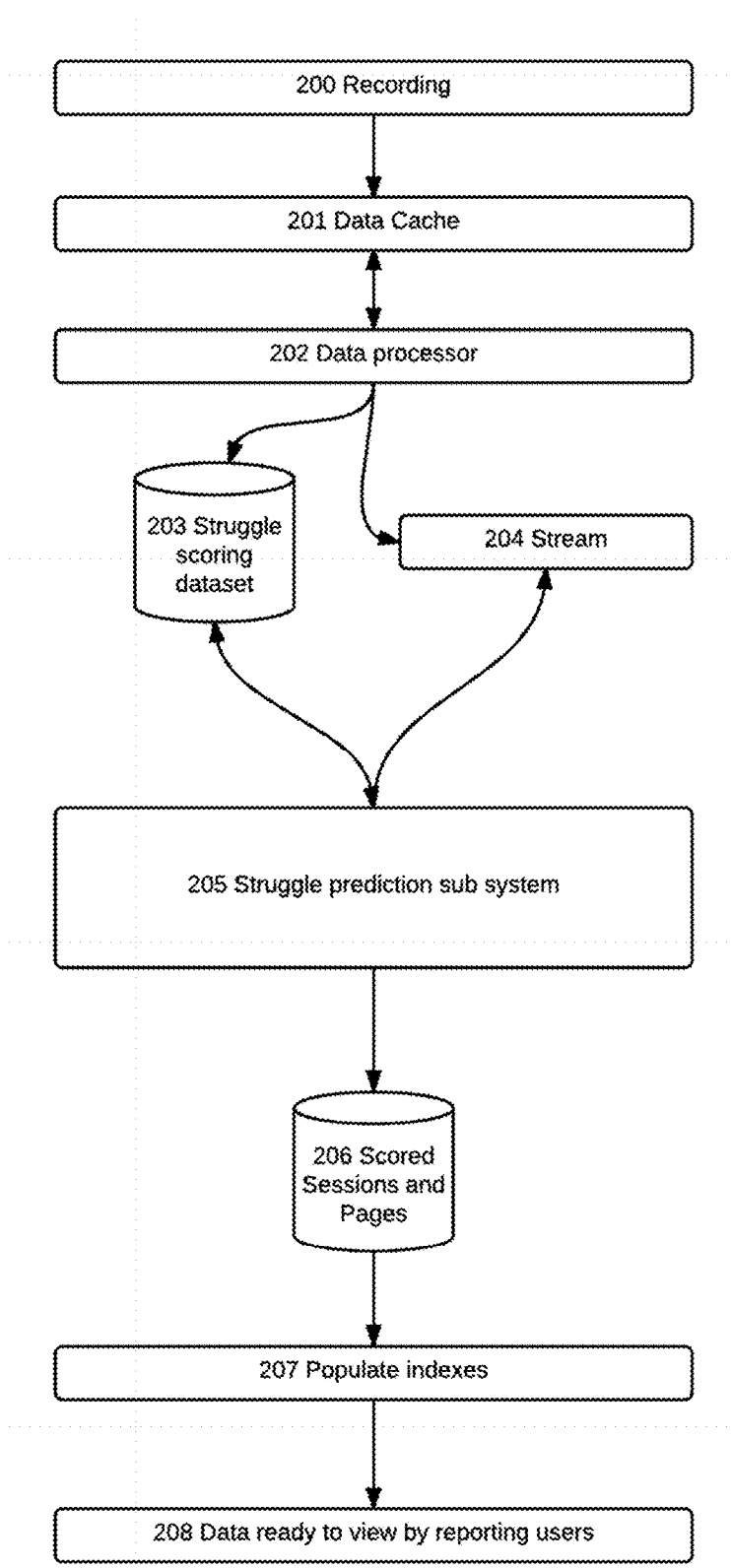
FIG. 2 is a flowchart illustrating a process for analysing user sessions according to the present disclosure.

User interaction data generated by a user session of interaction with a user interface is recorded in step 200 in FIG. 2. This data is stored in step 201 in a data cache and retrieved from the data cache by the data processor of the customer struggle scoring system in step 202. The retrieved data is saved into a struggle scoring dataset 203 and fed into a data stream 204. The data stream 204 provides a notification to a struggle prediction sub-system 205 that a set of event data is ready to be classified.

It will be appreciated that a feed of data for processing may be provided in a number of ways. The example described above with reference to FIG. 2 addresses issues of scale and allows for re-processing of data should failure occur during classification or further on in the process. Using a stream as a "control feed" passing pointers to a dataset to be processed provides an efficient way to enable the struggle prediction sub-system to classify large quantities of sessions of user interaction data.

A struggle prediction sub-system 205 monitors the data stream 204 and processes batched windows of user sessions. This processing is described in more detail below with reference to FIG. 3. The sub-system 205 calculates "struggle scores" in relation to portions of the user interface under consideration (such as individual website pages) and/or separate user sessions. These scores are stored in step 206 and used to update indexes responsible for subsequent reporting of results to an operator in step 207.

An operator may view the results via a website in step 208. The website may allow the operator to sort the sessions and/or website pages under consideration according to their struggle scores, in order to identify those sessions and/or pages which are most likely to be causing difficulty for the users.

An example of data processing which may be carried out in accordance with the present disclosure in order to generate a predictive model for use in identifying user struggles will now be described with reference to FIG. 3.

In order to distinguish normal user sessions from sessions where the user struggled, a representation of user behaviour that can occur in many different circumstances is created. User journeys can differ wildly between individual users of an interface such as a website and across many different types of interface. This variance is taken into account to normalise the behaviour observed across these many different circumstances.

A training dataset is produced from historical user interaction data and this data is loaded in step 301 for use in creating one or more models which are used to speed up analysis of a subsequent session.

In one embodiment, the user interaction data representing the user behaviour is broken down into gestures in step 302 that represent small portions of continual actions. The user interaction data may be derived from one or more of mouse movements, clicks, touches, scrolling and page movement, touchscreen-based gestures such as swiping, pinching and zooming, movements of a remote controller held by the user, and detection of movements of the user by other means, such as sensors able to detect remote user motions without requiring the user to use a controller.

Different devices generate user interaction data in different ways. For example, a desktop PC may take input from a mouse, touchscreen, joystick, or other biometric device. Multiple input sources may be used during the same session. Touchscreens for PCs or mobile devices may respond to multiple simultaneous touches, for example to provide "pinch-to-zoom" functionality. The data generated by these inputs may be utilised in embodiments of the present disclosure to analyse the behaviour of the user. The analysis may take into account the type of device providing the interface that is being used during a particular session.

A start and end of each user gesture may be defined by a period of inactivity of the input device longer than a predetermined threshold. Each user gesture may comprise a number of user interaction data points which is greater than a predetermined threshold.

In some embodiments, the user interaction data may be arranged into user gestures in the form of ngrams to provide an overlapping view of behaviour sequences.

In further embodiments, predetermined parameters may be used to define individual gestures on the basis of the user interaction data. For example, the length of a motion, and/or an inactivity threshold may be used. Filtering may be employed to exclude gestures which are of little use or those that will create noise for later stages of the analysis. In some embodiments, gestures with less than a predetermined number (3 for example) of user interaction data points are filtered out. Such parameters may be varied depending on the system and environment to which the method is applied.

Values for plurality of properties may be determined, for each user gesture that has been selected for further analysis, in step 304. The properties may be derived from one or more of: duration, "coverage", distance traveled, maximum speed, average speed, maximum acceleration, average acceleration, rotation and a direction associated with the gesture. The values may then be populated into a vector that represents features of the gesture. An example of a vector structure is described below with reference to FIG. 7.

The "coverage" of a gesture may be a value derived in various ways from user interaction data. For example, it may be derived from one or more of: a number of input device positions, that is, a count of the frequency of x and y coordinates contained in the user interaction data for a gesture; "total dispersal", which is the sum of the distances between adjacent pairs of input device positions in the gesture; and "average dispersal", which is the average distance between adjacent pairs of input device positions in the gesture.

The rotation value may be defined with reference to a plurality of angles defined by user interaction data forming a particular gesture. This may be based on angles defined between adjacent subsections of the gesture. Each subsection may be defined by a pair of adjacent data points, or by groups of adjacent data points. For example, a rotation value in a given range may indicate a user making circles with the mouse pointer. It may be used to highlight "higher level gestures" made by a user, which may be an indication of confusion or a user experiencing a high cognitive load.

A direction value may be defined by or with reference to the beginning and end mouse x and y co-ordinates of a gesture, and may be an angle made relative to a reference direction for example. It may be dependent on the direction in which the user was heading in the gesture.

In order to combine and/or compare these different features accurately, two or more of the properties may be scaled in step 305 to be represented in the same range. This may avoid a bias in weighting towards certain features, allowing the method to more accurately distinguish abnormal behaviour from that which is normal. In one embodiment, Box-Cox Transformation and Standardization are employed to provide a normalised view of some or all of the gesture properties.

Two or more gesture properties may be directly related to other each other, presenting values that create noise for the method when classifying the user behaviour. These relationships may change by device or circumstances of the user journey being analysed. To improve accuracy across a range of devices and circumstances, embodiments may employ dimensionality reduction (DR) methods in step 306 to automatically identify and re-weight features based on their correlation to one another. This may reduce the impact of correlating data on the analysis and increase the flexibility of applying the method to different types of user journey, device and circumstances. Dimensionality methods may include but are not limited to principal component analysis (PCA), linear discriminant analysis (LDA) and canonical correlation analysis (CCA). In one embodiment, a DR model is produced for analysis of user gestures.

Figure 3:
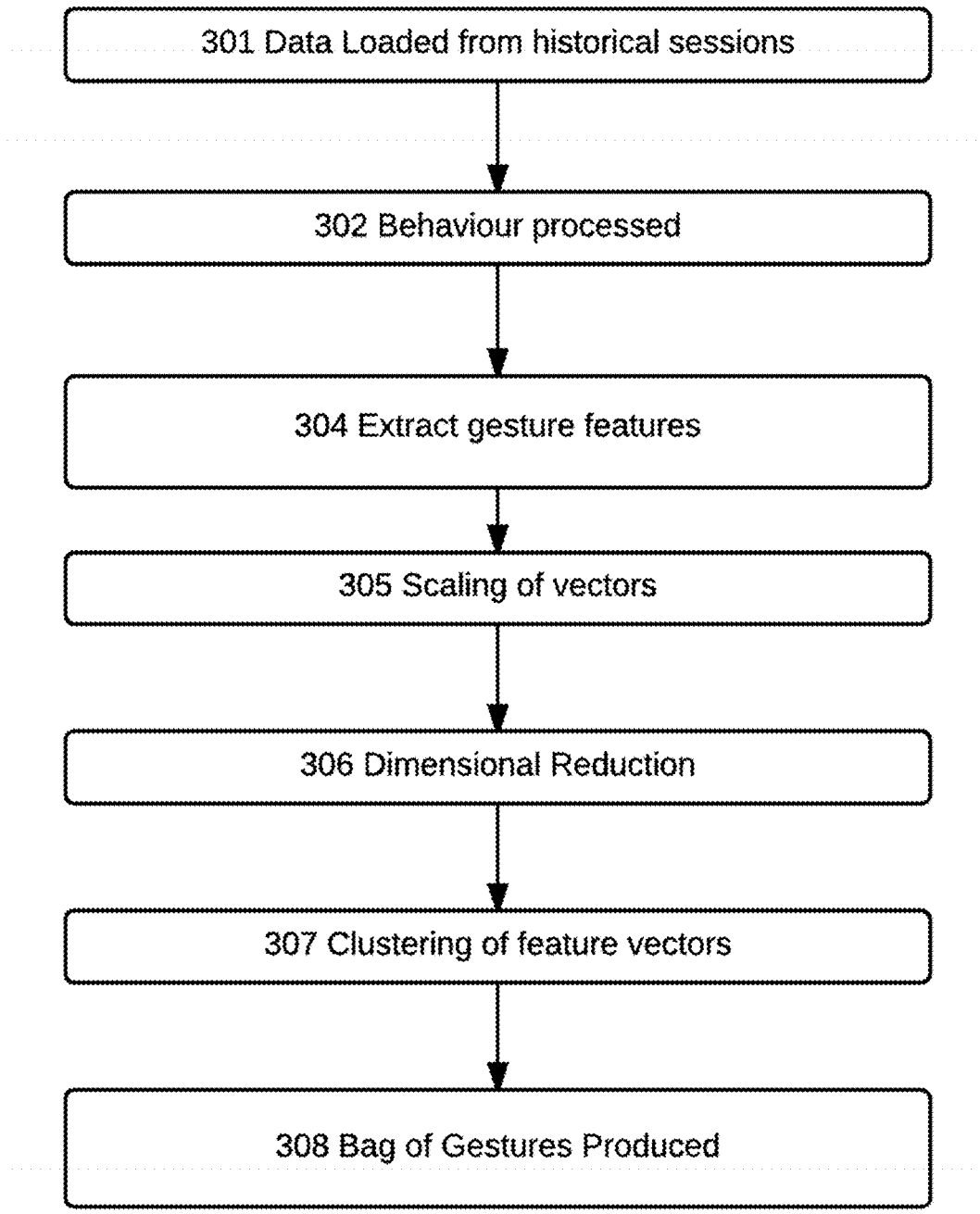
FIG. 3 is a flowchart illustrating a first portion of a process for generating a predictive model according to the present disclosure.
Figure 4:
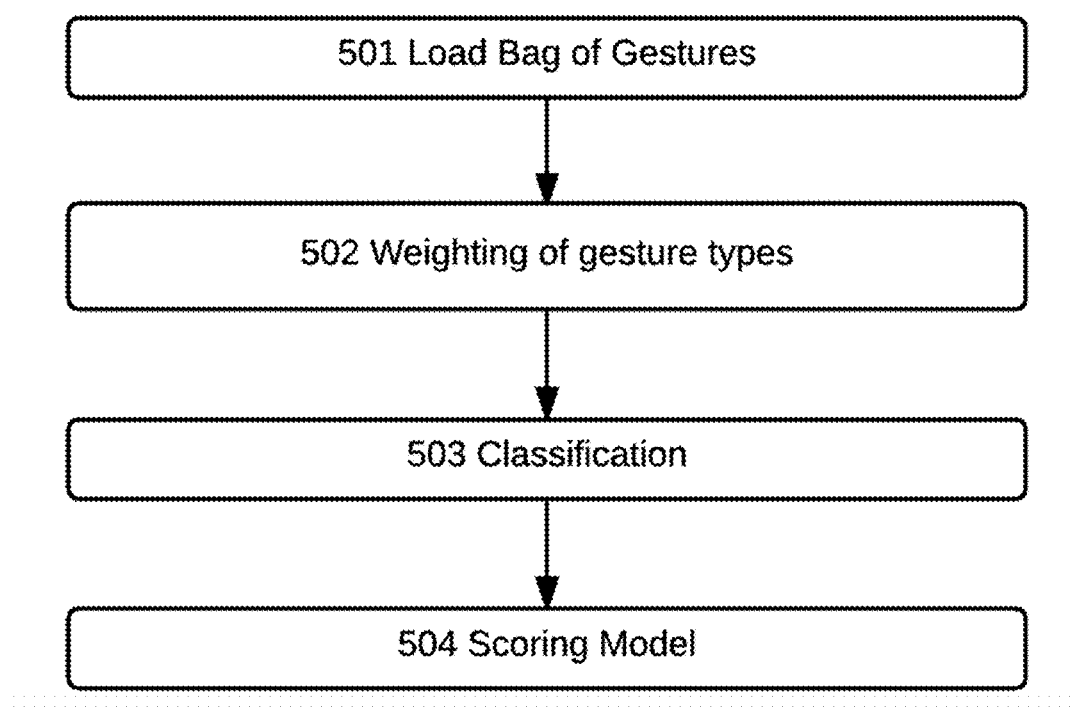
FIG. 4 is a flowchart illustrating a second portion of a process for generating a predictive model according to the present disclosure.

In the embodiment of FIG. 3, the scaled and dimensionally reduced feature vectors are clustered in step 307 to identify common groups of behaviour. Clustering methods may include but are not limited to centroid-based clustering, distribution-based clustering and density-based clustering. In some embodiments, density-based clustering (such as k-means) may be employed to divide the gestural vector space into K clusters providing a fast and efficient view of similar fragments of behaviour. In one embodiment, a scaling model is serialised and stored for analysis of user gestures.

The cluster output is transformed into a final Bag of Gestures (BoG) in step 308, which may represent the clusters and the frequency of gestures within each cluster.

Analysis of user sessions may well identify a high frequency of certain types of user gesture. These gestures are likely to represent common everyday activity of users and not be indicative of user struggle. Accuracy of the analysis may be improved by reducing the influence of mundane data, as described below with reference to FIG. 4.

In step 501, the data processor retrieves data representing the BoG from memory and re-weights the clusters in the BoG in step 502 to reflect the relative importance of each gesture cluster to the dataset. This weighting model may be serialised and stored so as to improve performance during subsequent analysis of user gestures.

Methods such as but not limited to term frequency-inverse document frequency analysis ("TF/IDF"), sublinear TF scaling and maximum TF normalisation may be used to distinguish the more important behaviour from the high frequency clusters of less significant gestures. In one embodiment, TF/IDF analysis may be used which employs an IDF calculation of the form:

$$IDF(w) = \log \frac{n+1}{DF(w)+1}$$

where:

"w" in the term IDF(w) identifies a cluster of gestures generated by step 307 (and may correspond to a label produced by the clustering process);

DF(w) represents the number of sessions, pages or session segments in a training set of data that contained a gesture belonging to cluster "w"; and "n" is the number of sessions, pages or session segments in the training data set.

The re-weighted BoG is then passed through a classifier in step 503. This classification step may employ methods such as logistic regression to produce a scoring model in step 504 which in one embodiment may be serialised and stored to be reused during subsequent analysis of user gestures.

The bag of gestures (BoG) and the scoring model have two modes: training (fitting) and predicting (transforming). During the training mode, the training data is used to produce models that will be used for predicting in the predicting mode.

Classification is the last step of the scoring process. While training, it takes the set of re-weighted BoGs obtained from training data. These re-weighted BoGs have an associated annotation indicative of struggle/no struggle. The classification algorithm (also called classifier) uses that information to produce a probabilistic classification model. In the predicting mode, the classification model takes as its input a re-weighted BoG and produces a score between 0 and 1. Values close to 1 indicate high probability of struggle while values close to zero indicate that struggle is unlikely.

Figure 5:
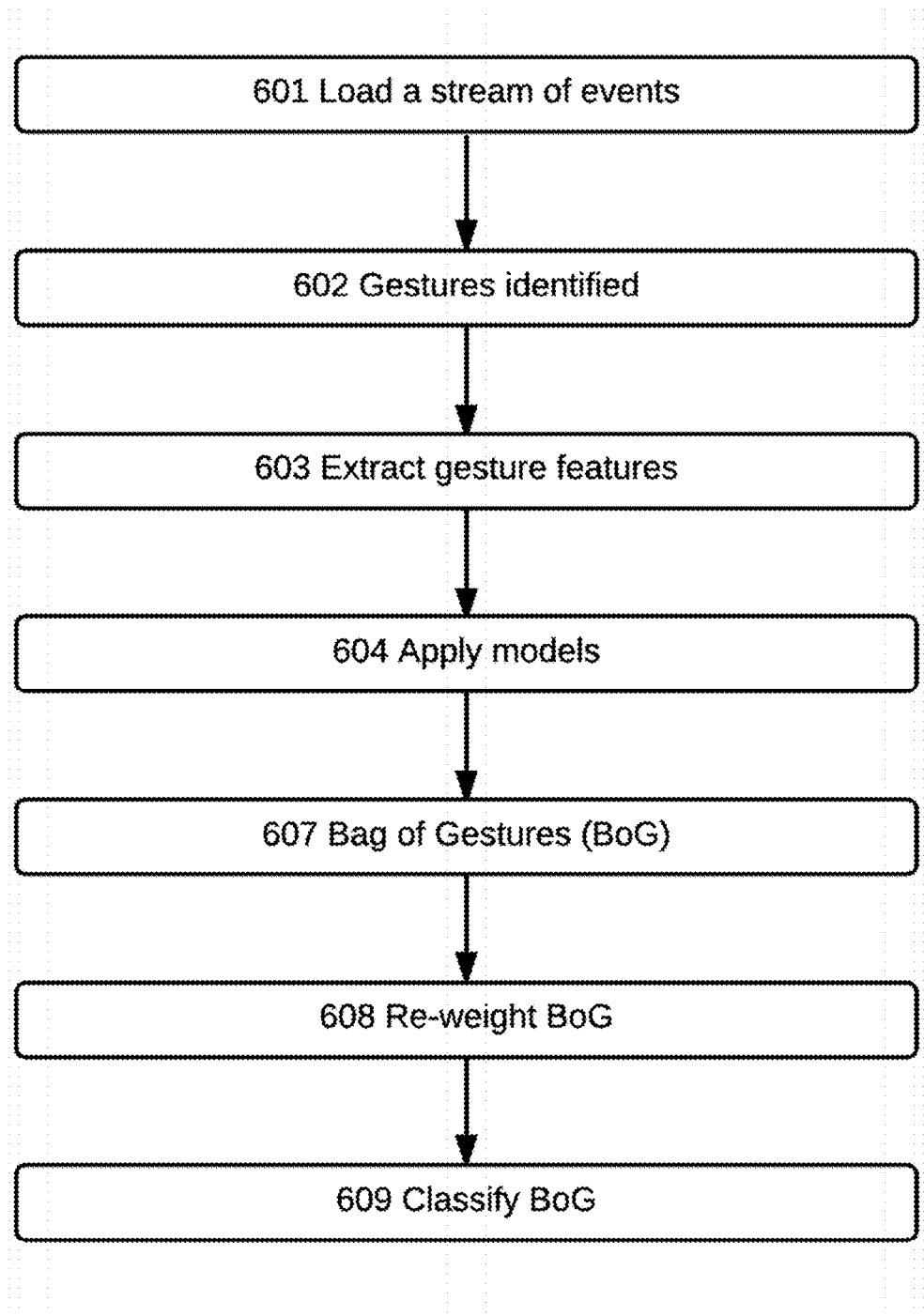
FIG. 5 is a flowchart illustrating a process for analysing a user session using a predictive model generated according to the present disclosure.

FIG. 5 describes the process of applying a predictive model comprising one or more of the models developed during the analysis described above to a further user session in order to predict the likelihood that it contains struggle points and/or identify any portions of the interface used by the user during the session which may be causing user struggle.

A set of user interaction data representing an event stream is retrieved by the data processor from storage. The data may correspond to a particular time window, or events relating to a selected page, session or group of sessions using the same interface.

In step 602, the user interaction data is split into separate user gestures as described above in the training pipeline step 302.

From these user gestures, multiple properties are then calculated in step 603, in a similar manner to step 304 above. The values associated with each property for the gesture are populated into a vector that represents features of the gesture.

Models that were generated during the training phase in scaling step 305, dimensional reduction step 306, and clustering step 307 are applied in step 604 to create a BoG in step 607. Use of the models may enable step 604 to be significantly quicker than steps 305 to 307, as the training phase tends to be a relatively slow process.

In step 608, the BoG is reweighted using the weighting model generated in step 502 above. The BoG is then scored in step 609 using a classifier and the scoring model developed in step 504 above. The scoring model may produce a figure indicating the likelihood that a user struggled within the processed set of events 601. The scoring model may be configured to generate a "struggle score" between 0 and 1 for example.

Figure 6:
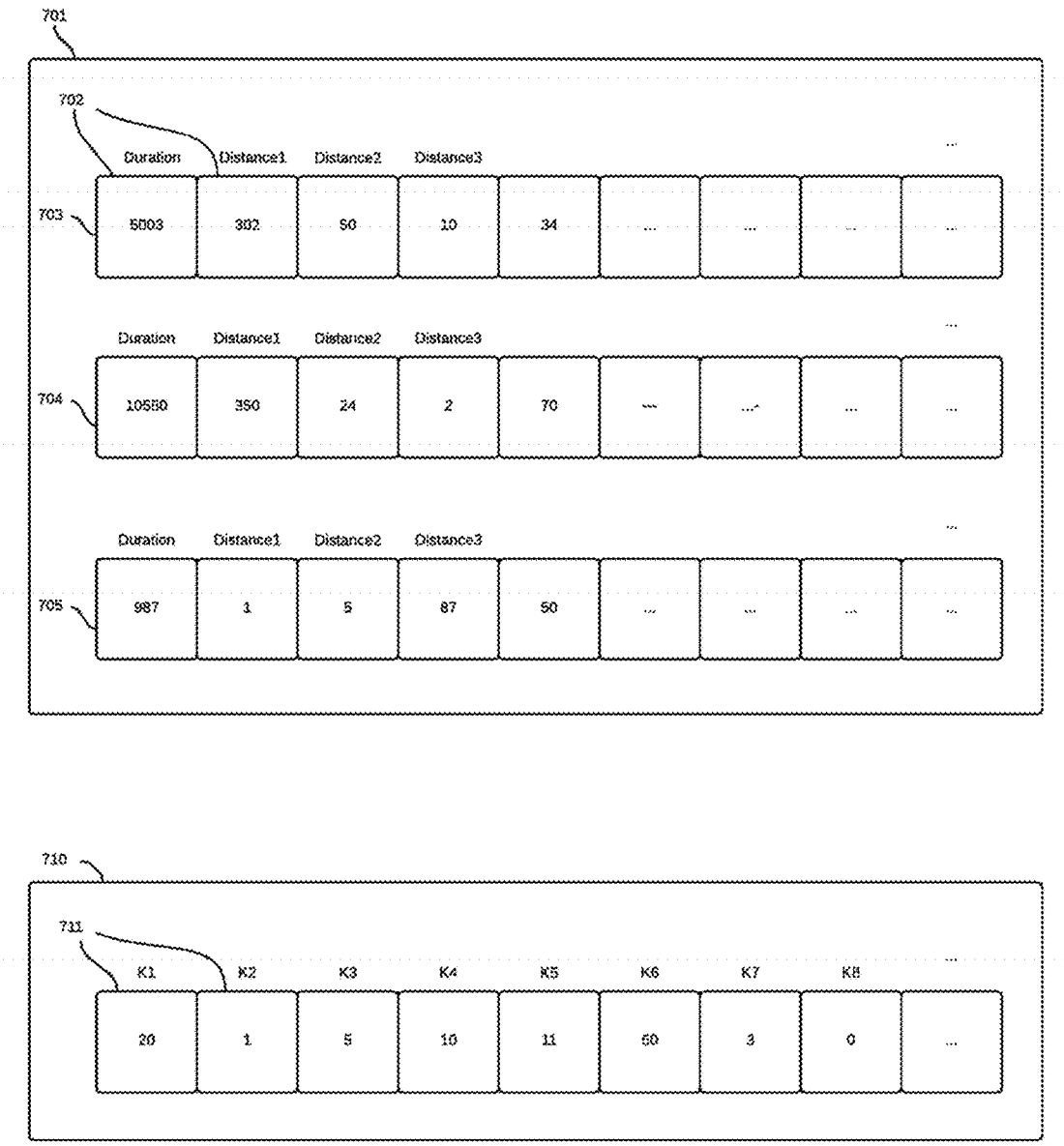
FIG. 6 illustrates the structure of vectors used to represent user gestures according to the present disclosure.

FIG. 6 schematically depicts a set 701 of three vectors and a BoG 710 according to one embodiment.

The set 701 of vectors consists of three vectors 703, 704 and 705. Each vector comprises values associated with a series of properties 702 of a corresponding user gesture. In the illustrated examples, the values are shown prior to application of the scaling model.

The BoG representation 710 comprises a plurality of clusters 711 (labelled K1, K2 and so on, respectively) which are produced by the clustering step 307 above. Each cluster may be identified by an associated number (shown as 20, 1, 5 and so on in FIG. 6 by way of example).

Figure 7:
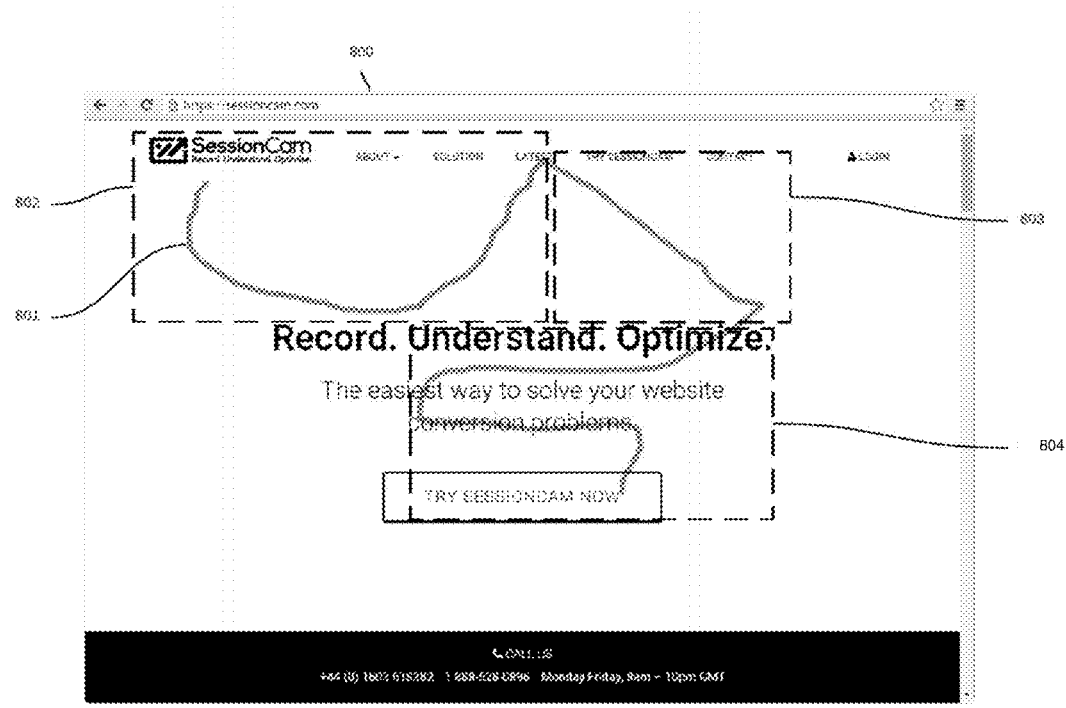
FIG. 7 is a screenshot illustrating division of a mouse movement trail into a number of user gestures according to the present disclosure.

FIG. 7 depicts an exemplary website page 800 with an example of a continuous mouse movement trail 801 superimposed on the page. To illustrate how the trail may be divided into discrete user gestures according to an embodiment of the present disclosure (see for example steps 302 and 602 above), boxes 802, 803 and 804 are shown which enclose respective portions of the trail. Each portion represents an individual user gesture.

The user who made this mouse trail paused at three locations along the trail while navigating this page, and the trail has been divided between the boxes 802, 803 and 804 such that the pauses define the start and end points of each user gesture.

Figure 8:
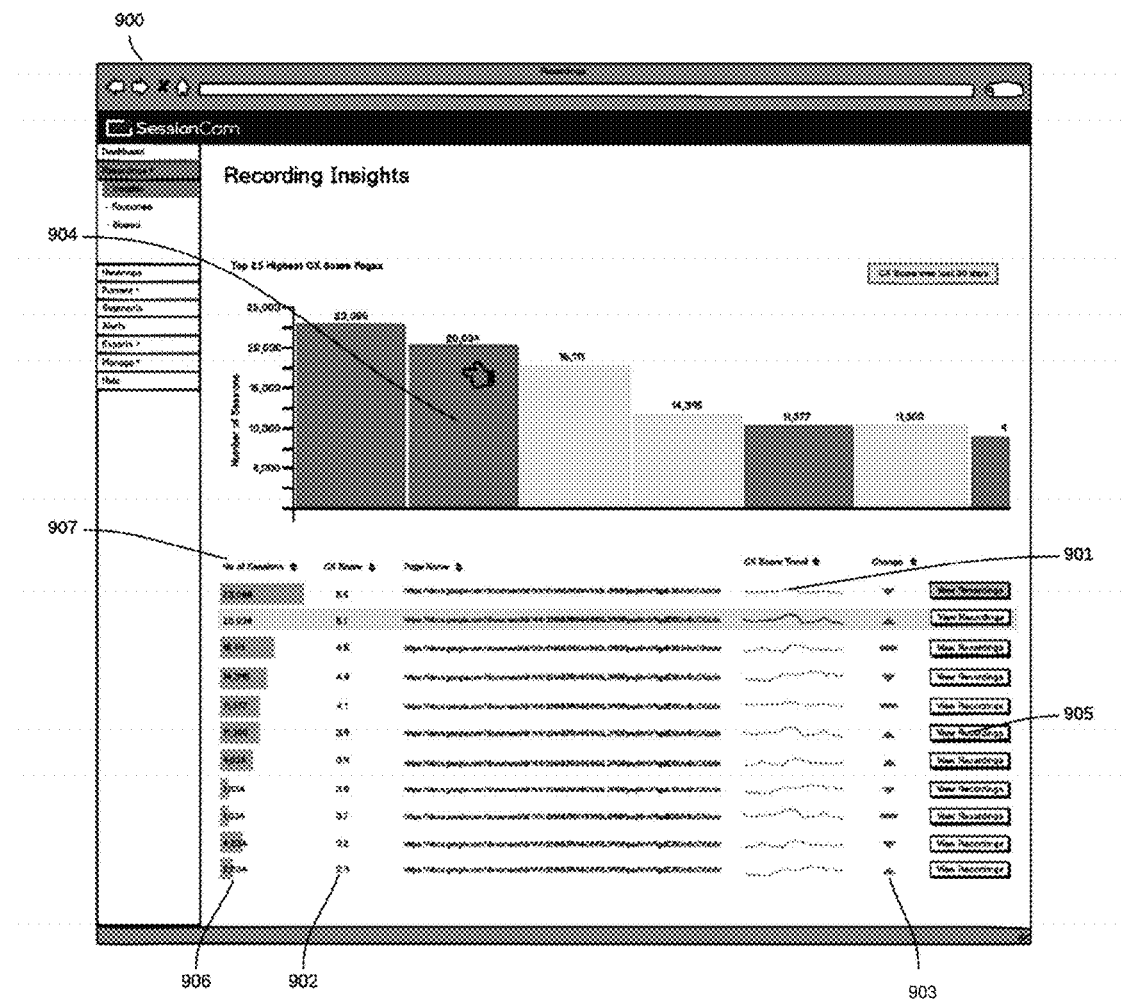
FIG. 8 is a screenshot illustrating an example of a display layout used to present results of user session analysis carried out according to the present disclosure.

FIG. 8 depicts an exemplary reporting page displaying results derived from analysis of user sessions according to an embodiment of the present disclosure. The illustrated results relate to user sessions involving interaction with a single website. They are visually presented in such a way as to facilitate efficient assessment of the results by an analyst. Such a report may be used by an analyst in order to identify portions of an interface which are most frequently causing the struggles so that the analysts attention can be focussed on those portions in most need of improvement.

The lower half of the reporting page is a list 907 of pages of the website. Column 902 indicates a current value of a struggle score for each page and the pages have been ranked in the reporting page according to their struggle score. A plot 901 is shown in relation to each of these pages to show how the respective struggle score is changing over time. This enables an analyst to see the impact on the struggle score of a page of any changes made to the page. The score 902 may be normalised over a range (for example 1 to 5) to facilitate fair comparison of the scores for different pages.

The list 907 may include an increase/decrease indicator 903 in relation to each page in the list, to enable an analyst to see quickly whether a problem area is getting better or worsening.

Further data and/or functionality may be provided in relation to each page in the list 907 to assist an analyst in prioritising which portions of an interface to focus on. For example, the number of user sessions involving the page over a given time period may be shown, so that pages with greater levels of use may be prioritised. In FIG. 8, the number of user sessions involving each page in the preceding 30 days is shown in column 906. Instead, or in addition, the number of sessions where user struggle has been detected in relation to each page over a given time period may be shown.

In the embodiment of FIG. 8, a button 905 is provided in relation to each page. An analyst may click on this button in order to replay user sessions involving one or more struggles encountered on that page. This may facilitate swift understanding of what users are experiencing at a given struggle point.

Data derived from analysis of user sessions in accordance with the present disclosure may be presented in the form of a graph 904. For example, it may show a bar chart illustrating the number of user sessions during a given time period which involved user struggle with each of a plurality of portions of the interface. The portions of the interface may be ordered in the graph according to the number of respective sessions, or their respective struggle scores, for example.

The following enumerated paragraphs represent illustrative, non-exclusive ways of describing inventions according to the present disclosure.

A. A computer-implemented method of analysing interactions between a user and a computing device, the method using at least one data processor and electronic data storage and comprising the steps of:

(a) storing user interaction data in the data storage, wherein the user interaction data is derived from user interactions with the computing device using an electronic input device during at least one user session, and with the at least one data processor:

(b) retrieving the user interaction data from the data storage;

(c) analysing the user interaction data to identify a plurality of user gestures;

(d) analysing the plurality of user gestures to identify user gestures likely to represent user struggles;

(e) generating a predictive model with reference to the analysis of step (d) for use in analysing user gestures to identify user gestures likely to represent user struggles; and (f) outputting the predictive model to the data storage.

A1. The method of paragraph A, wherein step (d) comprises analysing each user gesture to determine a numerical value for each of a plurality of gesture properties in relation to each user gesture.

A2. The method of paragraph A1, wherein the gesture properties correspond to at least one of: a duration of the gesture, coverage of a gesture, an average speed of the gesture, a maximum speed, an average acceleration during the gesture, a maximum acceleration, a distance traveled during the gesture, a rotation defined with reference to the gesture, and a direction of the gesture.

B. The method of any of paragraphs A1 to A2, wherein step (d) includes determining and applying a scaling process to the numerical values for at least one of the gesture properties.

C. The method of any of paragraphs A to B, wherein step (d) includes applying a dimensionality reduction method to a plurality of gesture properties.

D. The method of paragraph A1 or any of paragraphs A2 to C when dependent on paragraph A1, wherein step (d) includes defining a plurality of gesture clusters, with each cluster comprising a plurality of the user gestures, wherein each cluster is defined with reference to at least one of the gesture properties.

D1. The method of paragraph D, wherein step (d) includes assigning a weight value to each gesture cluster, with the weight value indicating a relative importance of the cluster in relation to the other clusters.

D2. The method of paragraph D1, wherein the weight value is determined using at least one of the following techniques: TF/IDF, sublinear TF scaling and maximum TF normalisation.

D3. The method of any of paragraphs D to D2, wherein step (d) includes assigning a struggle value to each gesture cluster, with the struggle value indicating the likelihood that the user gestures of the gesture cluster represent user struggles.

E. The method of any of paragraphs A to D3, wherein the input device is selected from: a mouse, a touch-sensitive screen, a joystick, and a system able to detect remote user movements.

F. The method of any of paragraphs A to E, wherein in step (c), a start and end of each user gesture is defined by a period of inactivity of the input device longer than a predetermined threshold.

G. The method of any of paragraphs A to F, wherein each user gesture identified in step (c) comprises a number of user interaction data points which is greater than a predetermined threshold.

H. The method of any of paragraphs A to G, wherein step (c) comprises arranging groups of consecutive user interactions into ngrams, each of which represents a user gesture.

I. A computer-implemented method of analysing user interactions with a computing device to identify user interactions likely to represent user struggles, wherein the method uses at least one data processor and electronic data storage storing the predictive model generated using a method of any of paragraphs A to H, and the method comprises the steps of:

(i) storing user interaction data in the data storage, wherein the user interaction data is derived from user interactions with the computing device using an electronic input device during a user session, and with the at least one data processor:

(ii) retrieving the user interaction data from the data storage;

(iii) analysing the user interaction data to identify a plurality of user gestures;

(iv) retrieving the predictive model from the data storage; and (v) analysing the plurality of user gestures using the predictive model to identify the user gestures likely to represent user struggles.

I1. The method of paragraph I, wherein the user interaction data is derived from user interactions during a plurality of user sessions involving a computer-implemented graphical interface, and the method includes the step of identifying a user session or a portion of the interface which is associated with user gestures likely to represent user struggles.

I2. The method of paragraph I1, wherein a plurality of sessions or portions of the interface are identified which are associated with user gestures likely to represent user struggles.

I3. The method of paragraph I1 or I2, wherein the at least one data processor calculates a respective struggle score for each of the sessions or portions indicative of the likelihood that it is associated with user gestures that represent user struggles.

I4. The method of paragraph I3, wherein the at least one data processor determines a priority order for the sessions or portions with reference to their respective struggle scores.

I5. The method of any of paragraphs I1 to I4, wherein the at least one data processor calculates a count value for a selected session or a portion of the interface with reference to how many of the user sessions involved user gestures likely to represent user struggles with the selected session or portion of the interface at a specified point in time or during a specified period of time.

I6. The method of paragraph I5, wherein the at least one data processor outputs signals for sending to a display device so as to cause the display device to display a plot of a parameter dependent on the count value for the selected session or portion of the interface against time.

I7. The method of paragraph I5 or I6, wherein the at least one data processor calculates the count value for a plurality of selected sessions or portions of the interface, and determines a priority order for the selected sessions or portions with reference to their respective count values.

I8. The method of any of paragraphs I to I7, wherein the at least one data processor receives an input signal identifying a user session, and outputs signals for sending to a display device so as to cause the display device to display a replay of at least part of the user session.

J. A non-transitory recording medium storing computer interpretable instructions for causing at least one data processor to perform the method in accordance with any of paragraphs A to I8.

K. A computing device comprising a memory device including computer interpretable instructions that, when executed, direct the computing device to perform the method of any of paragraphs A to I8, and at least one data processor.

Although the embodiments according to the present disclosure described with reference to the drawings comprise processes performed by a processing arrangement, the present disclosure also extends to computer programs comprising instructions for causing a processing arrangement or a computer to perform the processes. More particularly, computer programs on or in a non-transitory recording medium, adapted for putting the invention into practice are encompassed by the present disclosure. The program may be in the form of source code, object code, a code intermediate source and object code such as in partially compiled form, or in any other form suitable for use in the implementation of the processes according to the present disclosure. The recording medium may be any entity or device capable of carrying the program.

For example, the recording medium may comprise a storage medium, such as a ROM, for example a CD ROM or a semiconductor ROM, or a magnetic recording medium, for example a floppy disc or hard disk. Alternatively, the carrier may be an integrated circuit in which the program is embedded, the integrated circuit being adapted for performing, or for use in the performance of, the relevant processes.

Thus, the present disclosure provides a computer program comprising program instructions for causing a processor to perform the methods described herein. Furthermore it includes provision of such a computer program on a recording medium, embodied in a record medium, stored in a computer electronic memory, or embodied in a read-only electronic memory.

Aspects of the present disclosure may be embodied as a computer method, computer system, or computer program product. Accordingly, aspects of the present disclosure may take the form of an entirely hardware embodiment, an entirely software embodiment (including firmware, resident software, micro-code, and the like), or an embodiment combining software and hardware aspects. Furthermore, aspects of the present disclosure may take the form of a computer program product embodied in a computer-readable medium (or media) having computer readable program code/instructions embodied thereon.

Aspects of the present disclosure are described with reference to flowchart illustrations and/or block diagrams of methods, apparatuses, systems, and/or computer program products according to aspects of the present disclosure. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block or blocks.

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products according to aspects of the present disclosure. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

The invention claimed is:

1. A computer-implemented method of analysing interactions between a user and a graphical user interface of a computing device, the method using at least one data processor and electronic data storage and comprising the steps of:
 (a) storing user interaction data in the data storage, wherein the user interaction data is derived from user interactions with the graphical user interface using an electronic input device during at least one user session, and the user interaction data represents user motions which are captured electronically via use of the electronic input device, and
 with the at least one data processor:
 (b) retrieving the user interaction data from the data storage;
 (c) analysing the user interaction data to identify a plurality of user gestures, wherein each user gesture corresponds to a portion of the user interaction data that corresponds to a period of continuous movement by the user;
 (d) analysing the plurality of user gestures to identify portions of the user interaction data that correspond to periods of continuous movement by the user that are likely to represent user struggles, using statistical analysis to identify groups of similar gestures made by users of the graphical user interface which occur more frequently during use of the graphical user interface than during use of other graphical user interfaces;
 (e) generating a predictive model with reference to the analysis of step (d) for use in analysing user interaction data to identify the portions of the user interaction data that correspond to periods of continuous movement by the user that are likely to represent user struggles; and
 (f) outputting the predictive model to the data storage.

2. The method of claim 1, wherein step (d) comprises analysing each portion of the user interaction data that corresponds to a period of continuous movement by the user to determine a numerical value for each of a plurality of gesture properties in relation to each user gesture.

3. The method of claim 2, wherein the gesture properties correspond to at least one of: a duration of the gesture, coverage of a gesture, an average speed of the gesture, a maximum speed, an average acceleration during the gesture, a maximum acceleration, a distance traveled during the gesture, a rotation defined with reference to the gesture, and a direction of the gesture.

4. The method of claim 2, wherein step (d) includes determining and applying a scaling process to the numerical values for at least one of the gesture properties.

5. The method of claim 2, wherein step (d) includes defining a plurality of gesture clusters, with each cluster comprising a plurality of the portions of the user interaction data that correspond to periods of continuous movement by the user, wherein each cluster is defined with reference to at least one of the gesture properties.

6. The method of claim 5, wherein step (d) includes assigning a weight value to each gesture cluster, with the weight value indicating a relative importance of the cluster in relation to the other clusters.

7. The method of claim 6, wherein the weight value is determined using at least one of the following techniques: TF/IDF, sublinear TF scaling and maximum TF normalisation.

8. The method of claim 5, wherein step (d) includes assigning a struggle value to each gesture cluster, with the struggle value indicating the likelihood that the portions of the user interaction data that correspond to periods of continuous movement by the user of the gesture cluster represent user struggles.

9. The method of claim 1, wherein step (d) includes applying a dimensionality reduction method to a plurality of gesture properties.

10. The method of claim 1, wherein the input device is selected from: a mouse, a touch-sensitive screen, a joystick, and a system able to detect remote user movements.

11. The method of claim 1, wherein in step (c), a start and end of each user gesture is defined by a period of inactivity of the input device longer than a predetermined threshold.

12. The method of claim 1, wherein each user gesture identified in step (c) comprises a number of user interaction data points which is greater than a predetermined threshold.

13. The method of claim 1, wherein step (c) comprises arranging groups of consecutive user interactions into ngrams, each of which represents a user gesture.

14. A non-transitory recording medium storing computer interpretable instructions for causing at least one data processor to perform the method in accordance with claim 1.

15. A computing device comprising a memory device including computer interpretable instructions that, when executed, direct the computing device to perform the method of claim 1, and at least one data processor.

16. The method of claim 1, further comprising the steps of:
(g) storing further user interaction data in one of the data storage and a further data storage, wherein the further user interaction data is derived from further user interactions with a further computing device using a further electronic input device during a further user session, and with one of the at least one data processor and a further at least one data processor:
(h) retrieving the further user interaction data from the data storage;
(i) analysing the further user interaction data to identify a plurality of further portions of the further user interaction data that correspond to periods of continuous movement by the user;
(j) retrieving the predictive model from the data storage; and
(k) analysing the plurality of further portions of the user interaction data that correspond to periods of continuous movement by the user using the predictive model to identify further user gestures likely to represent user struggles.

17. The method of claim 16, wherein the further user interaction data is derived from user interactions during a plurality of further user sessions involving a computer-implemented graphical interface, and the method includes the step of identifying a further user session or a portion of the interface which is associated with the further user gestures likely to represent user struggles.

18. The method of claim 17, wherein a plurality of sessions or portions of the interface are identified which are associated with portions of the further portions of the user interaction data that correspond to periods of continuous movement by the user that are likely to represent user struggles.

19. The method of claim 18, wherein the at least one data processor calculates a respective struggle score for each of the sessions or portions of the interface indicative of the likelihood that it is associated with the portions of the further portions of the user interaction data that correspond to periods of continuous movement by the user that are likely to represent user struggles.

20. The method of claim 19, wherein one of the at least one data processor and the further at least one data processor determines a priority order for the sessions or portions with reference to their respective struggle scores.

21. The method of claim 17, wherein one of the at least one data processor and the further at least one data processor calculates a count value for a selected session or a portion of the interface with reference to how many of the further user sessions involved the portions of the further portions of the user interaction data that correspond to periods of continuous movement by the user likely to represent user struggles with the selected session or portion of the interface at a specified point in time or during a specified period of time.

22. The method of claim 21, wherein one of the at least one data processor and the further at least one data processor outputs signals for sending to a display device so as to cause the display device to display a plot of a parameter dependent on the count value for the selected session or portion of the interface against time.

23. The method of claim 21, wherein one of the at least one data processor and the further at least one data processor calculates the count value for a plurality of selected sessions or portions of the interface, and determines a priority order for the selected sessions or portions with reference to their respective count values.

24. The method of claim 17, wherein one of the at least one data processor and the further at least one data processor receives an input signal identifying a user session, and outputs signals for sending to a display device so as to cause the display device to display a replay of at least part of the user session.

25. A non-transitory recording medium storing computer interpretable instructions for causing at least one data processor to perform the method in accordance with claim 16.

26. A computing device comprising a memory device including computer interpretable instructions that, when executed, direct the computing device to perform the method of claim 16, and at least one data processor.

* * * * *